Feb. 19, 1963 L. E. WOLFE 3,077,790
CABLE BRAKE FOR TRUCKS
Filed Dec. 15, 1958 2 Sheets-Sheet 2
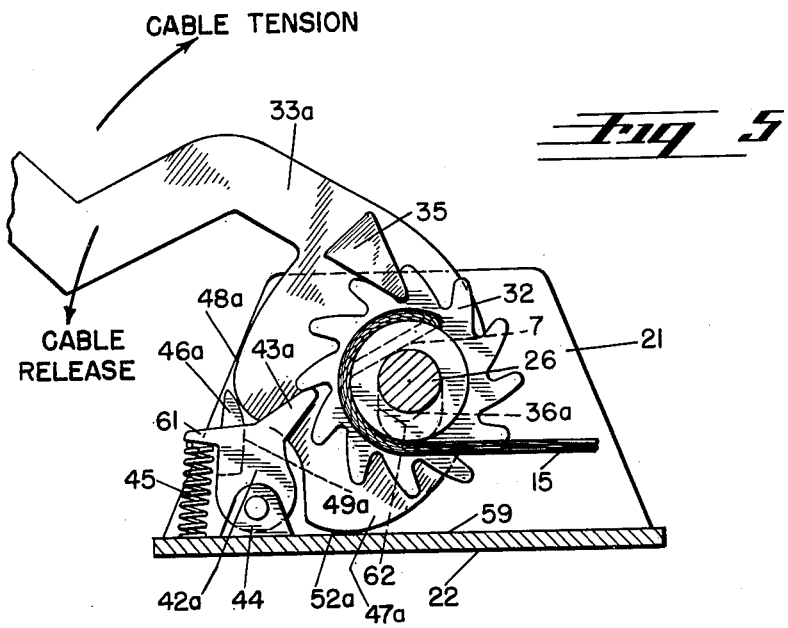
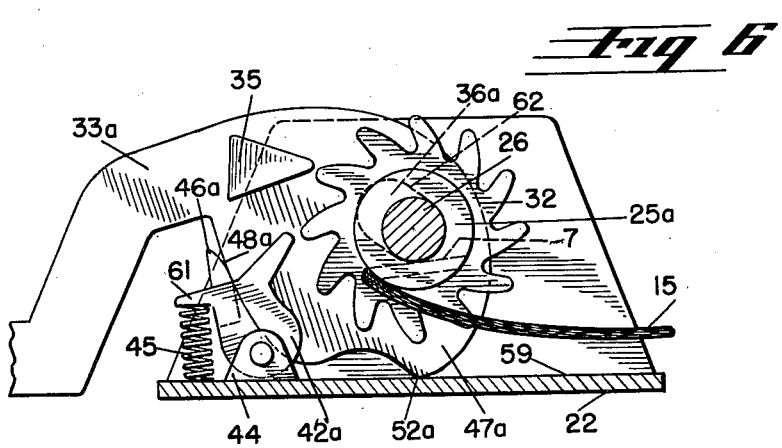
INVENTOR.
LESLIE E. WOLFE
BY
Knight & Rodgers
ATTORNEYS United States Patent Office 3,077,790
Patented Feb. 19, 1963

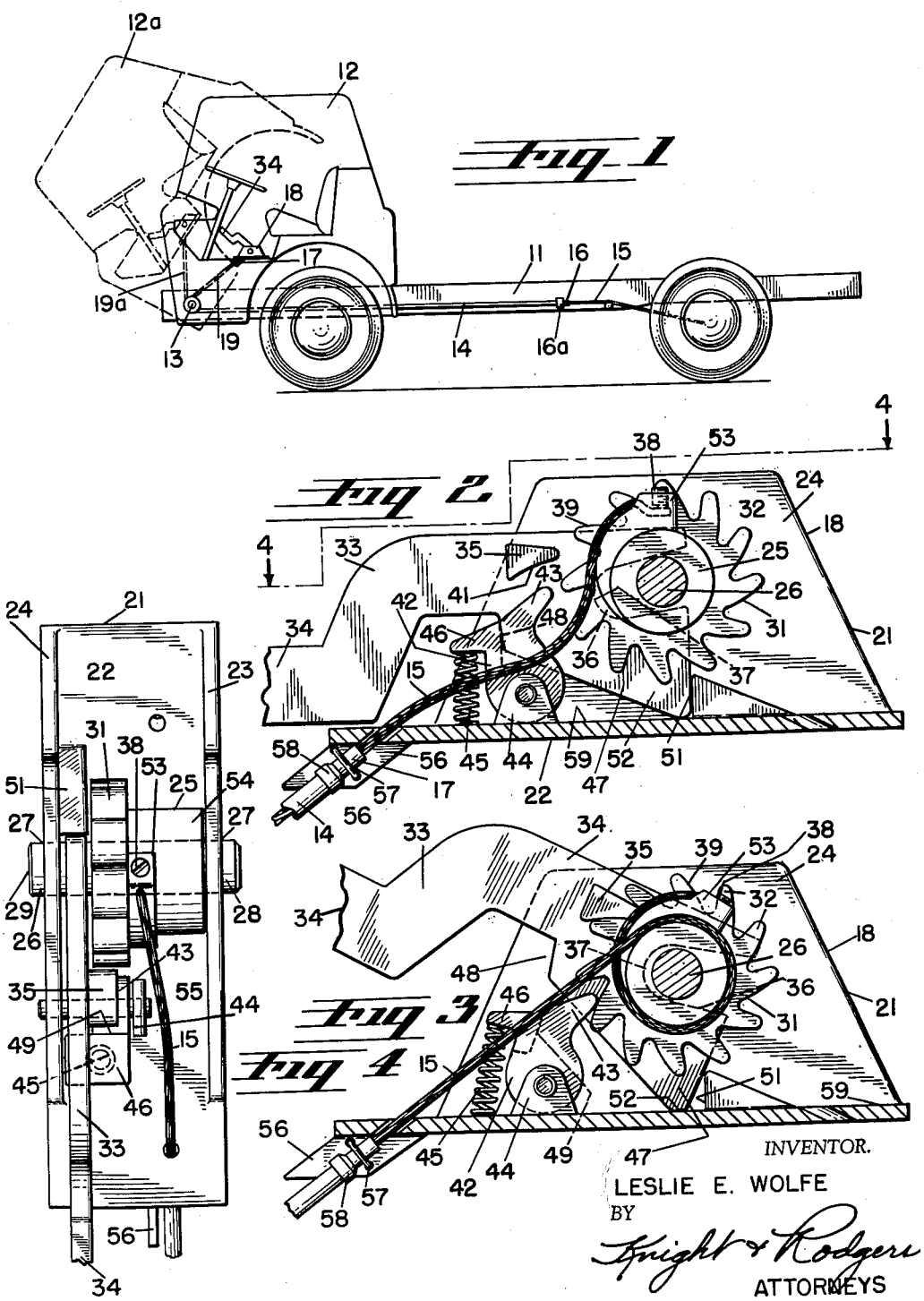

3,077,790
CABLE BRAKE FOR TRUCKS
Leslie E. Wolfe, 5836 Bonsallo Ave., Los Angeles, Calif.
Filed Dec. 15, 1958, Ser. No. 780,578
7 Claims. (Cl. 74—506)

This application relates generally to cable operators, and especially to manual means for operating an auxiliary system of vehicle brakes of the cable operated type.

An object of the invention is to promote safety in the operation of heavy motor trucks by providing effective manual brakes of great power which can bring heavy trucks to a stop, even on grades, in the event of failure of power operated hydraulic or pneumatic brakes.

A further object of the invention is to provide manual brake operating means for tilting cab trucks which exerts little or no force or reaction on the connections between the cab and the truck chassis and creates so distortion or strain on the pivoted joint between the movably mounted cab and the vehicle on which it is mounted.

Still another object of the invention is to provide a cable operator with fast slack takeup initially and higher mechanical advantage thereafter on tensioning of the cable throughout the maximum possible range of movement of the brake shoes.

Another object of the invention is to provide an effective and conveniently employed cable release which requires no separate manual actuator and may be actuated by reverse motion of the same lever which tensions the cable.

Another object of the invention is to accomplish complete release of the cable drum even when under heavy tension without risk of damage to ratchet teeth or detents from spinning of the cable drum which might be caused by release of brake tension.

A further object of the invention is to provide a manual brake operator having an operating lever which may rest out of the way on or in the floor of the cab so as to avoid danger of tripping the driver or interference with conventional occupany of the cab.

It is an object moreover to provide a cable operator in which the operating lever fully performs its required functions within an operating movement of 90° of angular motion.

Other and further objects, features and advantages of the invention will become apparent as the description proceeds.

In carrying out the invention in accordance with a preferred form thereof in a commercial vehicle or truck having a cab which tilts forward around a transverse pivot at the front end of the chassis of the vehicle, a brake operating cable is employed which is mounted in a tubular flexible housing extending from the cab to the brake mechanism adjacent the wheels, and passes around the pivot of the cab so that the cab may be pivoted without disengagement of the manual brake operating mechanism and without having any effect on the adjustment thereof.

A cable tensioner or operator is mounted within the cab having a lever pivotally mounted on a frame secured to the cab and to one end of the tubular cable housing so that the force of tensioning the cable reacts directly against the portion of the operator to which the cable end of the tubular housing is secured and there is little or no reaction or force between the cab and the vehicle chassis. Consequently, the connections of the cab to the chassis, for example the pivotal mounting of the cab upon the chassis, are not strained or endangered in any way by the manual operation of the brakes even though great force may be exerted on the brakes. A cable drum is mounted in the brake operator frame having a ratchet wheel secured thereto and a brake lever is so mounted in the frame that it has a primary pivot coaxial with the cable drum. The brake lever has a laterally projecting member enabling the cable to be tensioned by lifting the lever to engage said laterally projecting member with successive teeth of the ratchet.

The fulcrum end of the lever is adapted to limited movement with respect to the drum axis, however, by the provision of an elongated opening or slot in the fulcrum end of the lever to permit the teeth engaging member carried on the lever to be retracted from the ratchet wheel on reverse movement of the lever. As in the conventional pawl and ratchet mechanisms a spring pressed pawl is provided for engaging the ratchet teeth and preventing unwinding of the cable during the said reverse movement of the lever. The arrangement is such that when it is desired to allow the drum to unwind and release the brakes, the pawl may be retracted by further movement in the reverse direction of the brake operating handle. Moreover, the fulcrum end of the lever is so formed and so located in relation to the portion of the brake operator frame adjacent the pawl that the primary fulcrum is shifted before the pawl can be released in order to insure that the laterally projecting member on the lever is entirely free of the ratchet teeth prior to release of the pawl. In consequence, any tendency for the cable drum to spin from the tension of the cable cannot cause the ratchet teeth to strike the tooth on the lever and cause damage or breakage thereof.

In a preferred embodiment of the invention, this may be accomplished by providing a shoulder on the lever engageable with the pawl to retract the pawl from the ratchet when the lever is moved to an extreme position in a direction opposite to the cable winding or tensioning position. The lever at the end including its fulcrum is provided with a toe or a camming surface and the operator frame is suitably formed to provide a portion against which such a toe or camming surface acts when the lever is moved to the extreme position to shift the primary fulcrum to a position with the ratchet teeth fully disengaged from the teeth engaging member on the lever prior to the disengagement of the pawl from the ratchet teeth.

A better understanding of the invention will be afforded by the following detailed description considered in conjunction with the accompanying drawings in which:

FIG. 1 is a schematic side view of a truck showing running gear with chassis and a tilting cab and application thereto of my invention.

FIG. 2 is an enlarged detail view in vertical section of the brake operating mechanism mounted in the cab illustrated in FIG. 1 with an operating lever in brake-released position.

FIG. 3 is a view similar to FIG. 2 showing the operating lever in the cable tensioning or brake operating position.

FIG. 4 is a top view of the mechanism of FIG. 2 but rotated counter-clockwise 90°.

FIG. 5 is a view of a brake operating mechanism or cable tensioning mechanism forming another embodiment of my invention, FIG. 5 corresponding to FIG. 3 in showing the brake tensioning action.

FIG. 6 is a view of the apparatus of FIG. 5 in the cable released position.

Like reference characters are utilized throughout the drawing to designate like parts.

As illustrated in FIG. 1, the invention is shown as applied to a vehicle having a chassis 11 with cable-operated rear wheel brakes and a cab 12 which is adapted to tilt forward around a pivot shaft 13 in order to expose the engine (not shown) which is mounted under the cab in this type of vehicle. Motor vehicles of this type, particularly heavy motor trucks, are customarily provided with power operated brakes such as hydraulic or pneumatic brakes with flexible control lines from the operator's cab to the vacuum, pneumatic or hydraulic motors or the like, employed for actuating the brakes. Nevertheless, at times such power operated brakes fail at critical times and in the interest of safety it is desirable to provide an auxiliary brake system consisting of manually operated brakes, so-called hand brakes, of sufficient strength and power for stopping even a heavy vehicle on a grade. This introduces a problem in a truck of the tilting cab type because of the necessity for mounting the cab movably with respect to the truck chassis. Tilting-cab trucks normally employ a cab-mounting pivot shaft or axis which is not designed for the transmission of a large force from the cab to the chassis. The same is true of the rubber mountings in which the cab rests in normal operating position. Nevertheless great force may be generated by exertion of adequate brake power. Accordingly in order to overcome the need for transmitting force between the cab and the chassis, cab operated emergency brake mechanism is provided having a flexible tubular housing 14 enclosing a brake operating cable 15. The end 16 of the housing 14 near the brakes is securely fastened to the chassis 11 by a bracket 16a and the other end 17 of the flexible tubular housing 14 is securely fastened to brake operating mechanism 18 within the cab 12. Preferably the housing 14 is sheathed with rubber for weather protection.

As shown in FIG. 1 the normal operating position of the cab 12 during the driving of the vehicle is illustrated in full lines whereas the forward tilted position, represented by the reference numeral 12a, is shown in dashed lines. The flexible tubular housing 14 is brought around the cab pivot axis 13 on an arc concentric with the pivot axis so that the cab 12 may take either position without interfering with the brake mechanism, the end portion 19 of the tubular housing merely bending around the pivot axis 13 and taking a position 19a when the cab is tilted forward.

As illustrated in more detail in FIGS. 2 and 4, the brake operating mechanism 18 comprises a U-shaped frame 21 which may be formed from a heavy sheet or plate of steel with a base portion 22 and bent up side portions 23 and 24. It will be understood, however, that the invention is not limited to this specific shape of frame and does not exclude the use of cast or welded construction or other means for providing side portions secured to a base 22. A cable drum 25 is mounted in the frame 21 between the side portions 23 and 24, upon a shaft 26 extending through openings 27 forming bearings in the side portions 23 and 24. The shaft 26 may, if desired, be a through shaft or constitute stub ends 28 and 29 of the drum 25. A ratchet wheel 31 is provided which is securely mounted on the drum 25 preferably being integral therewith in order to insure holding of the brake mechanism upon the exertion of maximum force.

The cable operator 18 is shown as mounted horizontally, that is with bottom plate 22 resting on the floor of cab 12, since this is a common position in which the mechanism is installed. However, the invention is not limited to this position and the mechanism may be installed with base 22 in a vertical or inclined position.

As shown in FIGS. 2 and 3 the ratchet wheel 31 has a plurality of ratchet teeth 32. A lever 33 is provided, having a handle 34 shown in FIG. 1 and a fulcrum end carrying a laterally projecting member 35 on the side surface thereof which may be referred to as a tooth as it is adapted to engage and mesh with ratchet teeth 32. As shown in FIG. 4 the lever 33 lies along side of the ratchet wheel 31 so that the member 35 on the side surface of the lever is adapted to engage the ratchet teeth 32. The fulcrum end of the lever 33 is provided with a slot 36. This may be an open ended slot in the form of invention shown in FIGS. 2 and 3, but it is not limited thereto. In this form of the invention the slot 36 is elongated in a direction close to the direction along which the lever 33 extends but actually making a slight angle therewith, as illustrated. The slot 36 has an inner end 37 which may or may not bear against the shaft 26 to locate the primary fulcrum for the lever 33 at the center of the shaft 26. As may be seen in FIG. 3, when the teeth engaging member 35 is fully engaged with ratchet teeth 32, end surface 37 of the slot is preferably out of contact with shaft 26; and the fulcrum or axis about which the handle 33 turns is still the axis of shaft 26.

Cable 15 is secured at one end to the drum 25 in any suitable manner, for example, by means of a screw 38 as illustrated so that turning the drum 25 in a clockwise position as seen in FIGS. 1, 2 and 3 causes the cable to wind up and be tensioned for applying the brakes. In the arrangement illustrated, this is accomplished by lifting the handle 34 of the lever 33. This movement, without relying on gravity, causes the member 35 to engage one of the ratchet teeth 32, the fulcrum end of the lever 33 sliding longitudinally toward shaft 26 until teeth engaging member 35 is firmly seated in the space between two teeth 32. The upper surfaces 39 of the ratchet teeth 32 and the lower surface 41 of the member 35 on the lever are so shaped that when the handle 34 is moved downward (counterclockwise in FIG. 3) the member 35 readily slides out of a space between two teeth 32, retracting the end 37 of the slot 36 from the shaft 26 and allowing the member 35 to engage a following tooth 32.

To hold the ratchet wheel 31 and the drum 25 against reverse rotation when the lever 33 is moved downward, a holding pawl 42 is provided which has a conventional action in this respect with a pawl tooth 43 engaging the ratchet teeth 32. The pawl 42 as shown is pivotally mounted between the side plate 24 and an ear 44 secured to base 22 of the operating mechanism frame 21. The pawl is spring pressed or biased to the engaging position by a compression spring 45 mounted between base 22 of the frame 21 and a projection 46 on the pawl 42.

Preferably the lever 33 is so formed that the fulcrum end 47 is offset from the handle 34 so that the handle 34 may lie flat on the floor of the cab or if desired in a recess formed therein to avoid interference with the driver's movement in the cab and avoid tripping persons entering and leaving the cab when the brake handle 34 is not in use. The offset portion 47 of the brake lever 33 is formed with a shoulder 48 adapted to engage a lateral or transversely extending lug on the pawl 42 having a forward surface represented by hidden lines 49 in FIGS. 2 and 3.

A secondary fulcrum is provided for the lever 33 by forming an abutment or step 51 on the operator base 22, or on a side portion. The end portion 47 of lever 33 is extended downward to form a toe 52 adapted to engage the abutment 51 and serve as the secondary fulcrum. The proportions are such that when the lever 33 is moved downward from the position of FIG. 4 and before the shoulder 48 engages the face 49 of the lug of the pawl 42, toe 52 engages abutment 51 to force the lever away from its primary fulcrum. Since toe 52 is now held fixed by engagement with abutment 51, handle 33 rocks about its point of engagement with the abutment as a secondary fulcrum, thereby retracting the teeth engaging member 35 from the ratchet teeth 32 before the pawl 42 is disengaged from the teeth. Further movement of the lever 33 downward forces the pawl lug 49 backward so as to retract pawl tooth 43 from the ratchet teeth 32. The drum 25 is now free to rotate and cable 15 is free to unwind to release the brakes.

Since in heavy motor trucks it is necessary to apply a considerable amount of force to set the brakes, it is understood that cable 15 may be under great tension and the force thereof might cause such rapid initial motion of the ratchet teeth 32 upon unwinding of the drum, were the teeth engaging member 35 not first retracted, as to risk destructive striking of the ratchet teeth 32 against the detents. Such a possibility, however, is automatically avoided. It is unnecessary for the driver to utilize a separate actuator for releasing the pawl 42 when he desires to release the brakes; the proper sequence in the disengagement of teeth takes place without consideration by the driver. Less than 90 degrees of movement between extreme angular positions of the lever 33 is required for brake setting and release.

As illustrated in FIG. 4 the drum 25 is formed with a larger diameter portion 53 carrying the fastening screw 38 by which the end of the cable 15 is secured and a smaller diameter portion 54 which may, for example, be of one-half the maximum diameter of portion 53. Since the cable end is secured to the larger diameter, portion 53, it first winds up on this portion when the drum is turned in a clockwise direction by lifting the handle so that the initial slack in the cable is taken up quickly. Thereafter the cable rides down to the smaller diameter portion 54 to provide great mechanical advantage and enable the driver to exert great force on cable 15 sufficient to set the brakes adequately for holding a heavy vehicle. Preferably the drum 25 is formed with a spiral groove 55 therein beginning at the fastened end of the cable adjacent screw 38 and extending helically with decreasing radius to the reduced diameter portion of the drum 25. In this manner the cable 15 rides smoothly off the reduced diameter portion 54 when the brakes are released and rewinds with uniform action, first on the larger diameter portion 53 and then on the smaller diameter portion 54 when the brakes are set.

Although the invention is not limited to the precise arrangement illustrated to secure the end 17 of the flexible cable housing 14 to the frame 21 of the brake operating mechanism, this may be accomplished as illustrated in FIG. 2 by forming a wing 56 on the lower surface of base 22 of frame 21 and clamping the end 17 to the wing 56 by means of a U-bolt clamp 57. As shown, tubular housing 14 may be provided with a collar 58 which guards against any possibility of the end 17 of the housing 14 being pulled upwardly through the U-bolt 57.

A variational form of my invention that is constructed as previously described except for lever 33a and certain other features mentioned below, is shown in FIG. 5 and 6. This form shows that the invention is not limited to an open slot 36 in the lever 33 nor to the provision of an abutment or step 51 on the base 22 of the frame 21 in order to accomplish an operational sequence in which lowering of the handle 34 first disengages teeth engaging member 35 from the ratchet wheel 31 and then disengages the pawl tooth 43 from the ratchet wheel 31. This operation may be achieved also with a frame having a flat or smooth base 22 as illustrated in FIGS. 5 and 6, in which lever 33a has a closed slot 36a preferably elongated in a direction more nearly transverse to the length of the lever 33a. In this embodiment, as in the embodiment of FIGS. 2 and 3, the lever 33a is provided with a primary fulcrum coincident with the drum shaft 26. The secondary fulcrum for enabling the teeth engaging member 35 to be drawn from between the teeth of the ratchet wheel 31 even when the cable 15 is under great tension before releasing the pawl is obtained by forming the fulcrum end of the lever 33a as a cam with a nose or high cam portion 52a adapted to engage and bear against the top inner surface 59 of the base 22 of the frame 21.

Pawl 42a is slightly modified in shape. It is spring pressed by compression spring 45 bearing between the bottom plate surface 59 and a projection 46a on the back of the pawl 42a. The pawl 42a, as in FIGS. 2 and 3, is provided with a transversely extending projection with a front surface 49a against which a shoulder 48a formed in the lever 33a is adapted to bear as the lever 33a approaches its lowermost position as illustrated in FIG. 6.

When it is desired to release the brakes and take the tension off the cable 15, the lever 33a is moved downward beyond the normal operating range for the ratchet 31 so that the high cam portion 52a bears down upon the surface 59 of the base 22. Rotation of lever 33a with cam 52a engaging base 22 moves the fulcrum end of the lever 33a upward, sliding the side surfaces of the elongated slot 36a along the drum shaft 26 and forcing the teeth engaging member 35 from between the teeth of the ratchet wheel 32. Thereafter further motion of the lever causes the shoulder 48a to bear against the pawl surface 49a. In this case the position of the engagement of cam 52a and base 22 becomes the secondary fulcrum about which lever 33a rocks. The side edge 62 of the elongated slot 36a serves to prevent lengthwise or longitudinal movement of the lever 33a when the high cam position 52a is bearing down against the surface 59. Consequently the shoulder 48a reacts backward against the pawl 42a forcing it back and retracting the pawl from the teeth 32 of the ratchet wheel 31. Since this occurs after the member 35 is completely free from the ratchet wheel, the ratchet wheel is free to rotate and there is no risk of breakage of teeth or detent even though the cable 15 may be released when it is under great tension.

A comparison of the two forms of the invention shows that in both forms the lever when moved in a reverse direction, that is in a direction opposite to the direction of movement for winding the cable on the drum, moves into engagement with a stationary portion of the frame. Movement in the reverse direction not only brings the lever into engagement with the holding pawl but the engagement with the frame during the reverse movement causes the lever to rock about a secondary fulcrum resulting in disengagement of the lever from the ratchet teeth. This disengagement is effected mechanically and positively; and the proportions of the parts are such that a high mechanical advantage is obtained which enables the operator to easily overcome the friction between the ratchet teeth and the holding pawl as the lever moves the pawl away from the teeth. Movement of the lever about the secondary fulcrum also involves movement relative to the shaft which determines the primary fulcrum.

The relative shape of the rachet teeth and the teeth engaging member 35 on the lever is such as to produce a cam action retracting the teeth engaging member from the ratchet during the initial portion of said reverse movement.

It will be noticed in FIGS. 5 and 6 that the cable leaves the drum in a direction generally parallel to the frame base. In this embodiment of the invention the cable, connected at 7 to the drum, may extend away from the drum in any direction desired since the cable has no housing to be anchored to the base. In the first embodiment decribed the cable housing is anchored to the base and consequently any device is mounted in such a position that the cable extends away from the drum to pass through the base. However, it will be realized that the frame may be changed in shape if desired to provide an anchor for the cable housing at some other position.

This form of my invention illustrates a simplified form of drum 25a from which the section 53 of increased diameter has been omitted, leaving only a drum of uniform diameter. However, it will be appreciated that the larger diameter portion may be used in this form of the invention if desired.

Certain embodiment of the invention and certain methods of operation embraced therein have been shown and particularly described for the purpose of explaining the principle of operation of the invention and showing its application, but it will be obvious to those skilled in the art that many modifications and variations are possible, and it is intended therefore to cover all such modifications and variations as fall within the scope of the invention which is defined in the appended claims.

I claim:

1. Cable tensioning mechanism comprising in combination, a control lever, a frame therefor having a base portion, a cable drum with a ratchet wheel secured thereto and a shaft journaled in said frame, a cable secured at one end to the drum, the lever having a handle at one end and being formed with a slot in the other end engaging the shaft beside the ratchet to define at one end of the slot a primary fulcrum for the lever, a teeth engaging member on the lever engageable with the ratchet wheel and disengageable by motion of the lever relative to the shaft, the portion of the lever at the end toward the fulcrum having a cable releasing shoulder, and a spring pressed pawl pivotally mounted on the frame with a tooth engageable with the ratchet wheel to hold the cable and having a surface engageable by said lever shoulder when the lever is moved in a cable unwinding direction to retract the pawl from the ratchet wheel, the end of the lever including the primary fulcrum being formed to bear against the base portion of the frame when the lever approaches the pawl retracting position to form a secondary fulcrum for urging the end of the slot defining the primary fulcrum away from the shaft when the lever is moved toward the pawl retracting position for retracting the lever detent from its ratchet wheel before the pawl is retracted to release the cable, whereby cable drum and ratchet wheel may spin freely for cable release.

2. A manual brake operator comprising a brake lever, a frame therefor, a brake operating cable, the frame having a base portion and side plate portions, a cable drum with a ratchet wheel secured thereto and a shaft journaled in said side plate portions, the brake lever having a handle at one end and being formed with a slot in the other end engaging the shaft beside the ratchet wheel, one end of said slot engaging the shaft to define a primary fulcrum for the brake lever, a lateral projection on the side of the lever toward the ratchet wheel engageable with the ratchet wheel and disengageable therefrom by motion of the lever relative to the shaft, the portion of the lever at the end toward the fulcrum having a cable releasing shoulder, and a spring pressed pawl pivotally mounted on the bottom portion of the brake operator frame with a tooth engageable with the ratchet wheel to hold the brake cable and having a surface engageable by said lever shoulder when the lever is moved in a cable unwinding direction to retract the pawl from the ratchet wheel, the fulcrum end of the lever being formed to bear against the base portion of the frame when the lever approaches the pawl retracting position to form a secondary fulcrum to urge the end of the slot defining the primary fulcrum away from the shaft when the lever is moved toward the pawl retracting position for retracting the lever detent from its ratchet wheel before the pawl is retracted to release the brake cable, whereby cable drum and ratchet wheel may turn freely upon brake release.

3. A manual brake operator comprising a brake lever, a frame therefor, a brake cable having a housing with one end secured to the frame, the cable extending through the housing for operating a brake, the frame having a base portion and side plate portions with opposite holes therein serving as bearings, a cable drum with a ratchet wheel secured thereto and a shaft journaled in said holes, the brake lever having a handle, a slotted end adapted to engage the shaft beside the ratchet wheel as a primary fulcrum and teeth-engaging member located between the slotted end of the lever and its handle, engageable with the ratchet wheel and disengageable therefrom by longitudinal motion of the lever relative to the shaft at the slot in the lever, the slotted end of the lever being offset to permit the handle to lie in downward position flat along the bottom plate portion of the frame, the offset portion having a shoulder with an edge away from the slotted end of the lever, and a spring pressed pawl pivotally mounted on the bottom portion of the frame with a tooth engageable with the ratchet wheel to hold the brake and having a surface engageable by said lever shoulder when the lever is moved toward the downward position to retract the pawl from the ratchet wheel, the base portion of the frame having an abutment serving as a secondary lever fulcrum, and the bottom edge of the slotted end of the lever extending downward from the slot to form a toe adapted to fulcrum against said abutment and urging the primary fulcrum of the lever away from the shaft when the lever is moved toward its bottom position for retracting the lever detent from the ratchet wheel before the pawl is retracted to release the brake cable, whereby cable drum and ratchet wheel may spin freely upon brake release.

4. In a vehicle having a chassis and a cab movably mounted thereon, the combination comprising: a brake lever, a frame therefor secured to the cab, cable tightening means mounted on the frame and operated by said lever, cable operated brake mechanism secured to the vehicle chassis, a flexible tubular housing secured at one end to the frame and at the other end to the vehicle chassis adjacent the brake mechanism, a cable extending through the tubular housing and connected at one end to the cable tightening means and at the other end to the brake mechanism, whereby the force required to operate the brake mechanism may be transmitted thereto by the cable without reaction between the cab and the chassis, the reaction to the force of the lever being against the end of the tubular housing secured to the frame.

5. In a vehicle having a chassis and a tilting cab, the combination comprising: a brake lever, a frame therefor secured to and within the cab, cable tightening means mounted on the frame and operated by said lever, cable-operated brake mechanism secured to the vehicle chassis, a flexible tubular housing secured at one end to the frame and at the other end to the vehicle chassis adjacent the brake mechanism and a cable extending through the tubular housing and connected at one end to the cable tightening means and at the other end to the brake mechanism, whereby the force required to operate the brake mechanism may be transmitted thereto by the cable without reaction between the cab and the chassis, the reaction to the force of the lever being against the end of the tubular housing secured to the frame.

6. In a vehicle having a chassis and a cab pivotally mounted thereon with a pivot axis having a fixed relation to the chassis, the combination comprising: a brake lever, a frame therefor secured to the cab, cable tightening means mounted on the frame and operated by said lever, cable operated brake mechanism secured to the vehicle chassis, a flexible tubular housing extending from the cab around said pivot axis, secured at one end to the frame and at the other end to the vehicle chassis adjacent to brake mechanism, and a cable extending through the tubular housing and connected at one end to the cable tightening means and at the other to the brake mechanism, whereby the force required to operate the brake mechanism may be transmitted thereto by the cable without reaction between the cab and the chassis, the reaction to the force of the lever being against the end of the tubular housing secured to the frame, whereby the cab may be pivoted without disassembly or adjustment of brake linkage.

7. In a manual brake operator for vehicle brakes, the combination comprising:
  a frame for attachment to the vehicle;
  a shaft mounted on the frame at a fixed position relative thereto;
  an operating lever having an elongated opening therein receiving the shaft to pivotally mount the lever upon the frame to rock about the shaft as a first fulcrum, said lever having a ratchet engaging tooth;
  a ratchet wheel and drum assembly on said shaft and rotatable by engagement of the tooth on the lever with the ratchet wheel to wind a brake operating cable on the drum when the drum and lever are rotated in the forward direction;
  a pawl pivotally mounted on the frame, and means urging the pawl to a position to engage the ratchet wheel to hold it against reverse rotation induced by tension in the cable;

stationary means mounted directly on the frame engageable with the lever to establish a second fulcrum spaced from the first fulcrum and about which the lever can rock, rocking movement of the lever about the second fulcrum in a reverse direction shifting the lever to a position in which the tooth on the lever is out of the path of the ratchet wheel;

and means providing mutually engageable cam surfaces on the lever and pawl brough into contact by said reverse rocking movement of the lever, whereby continued reverse movement of the lever forces the pawl out of engagement with the ratchet wheel.

References Cited in the file of this patent

UNITED STATES PATENTS

| | | |
|---|---|---|
| 268,545 | Salisbury | Dec. 5, 1882 |
| 639,095 | Roseman | Dec. 12, 1899 |
| 1,063,770 | Brocklebank | June 3, 1913 |
| 1,072,439 | Duryea | Sept. 9, 1913 |
| 1,084,247 | Bolen | Jan. 13, 1914 |
| 1,248,480 | Greenway | Dec. 4, 1917 |
| 1,306,803 | Crewson | June 17, 1919 |
| 1,340,321 | Brown | May 18, 1920 |
| 1,813,447 | Haubert | July 7, 1931 |
| 2,507,997 | Roedding et al. | May 16, 1950 |
| 2,719,697 | Palka | Oct. 4, 1955 |
| 2,873,979 | Venditty et al. | Feb. 17, 1959 |

FOREIGN PATENTS

| | | |
|---|---|---|
| 312,618 | Switzerland | Mar. 29, 1956 |
| 793,345 | Great Britain | Apr. 16, 1958 |
| 1,098,411 | France | Mar. 2, 1955 |